Figure 1:
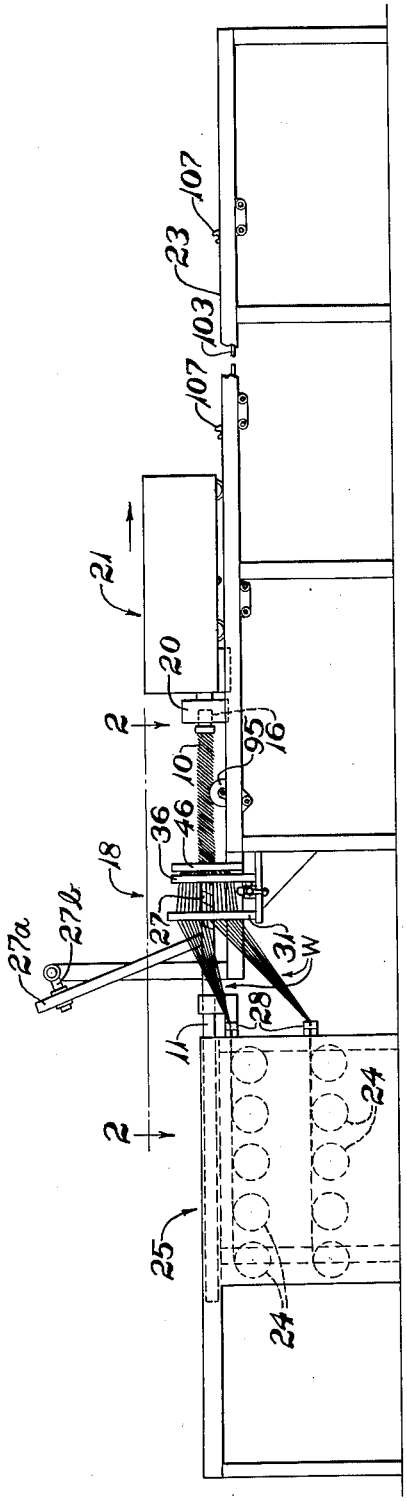

June 5, 1962 W. HAAS ET AL 3,037,343
METHOD AND APPARATUS FOR MANUFACTURING HOSE
Filed April 11, 1957 4 Sheets-Sheet 1

INVENTORS
WILLARD HAAS
MERLE A. FULLER
BY
ATTY.

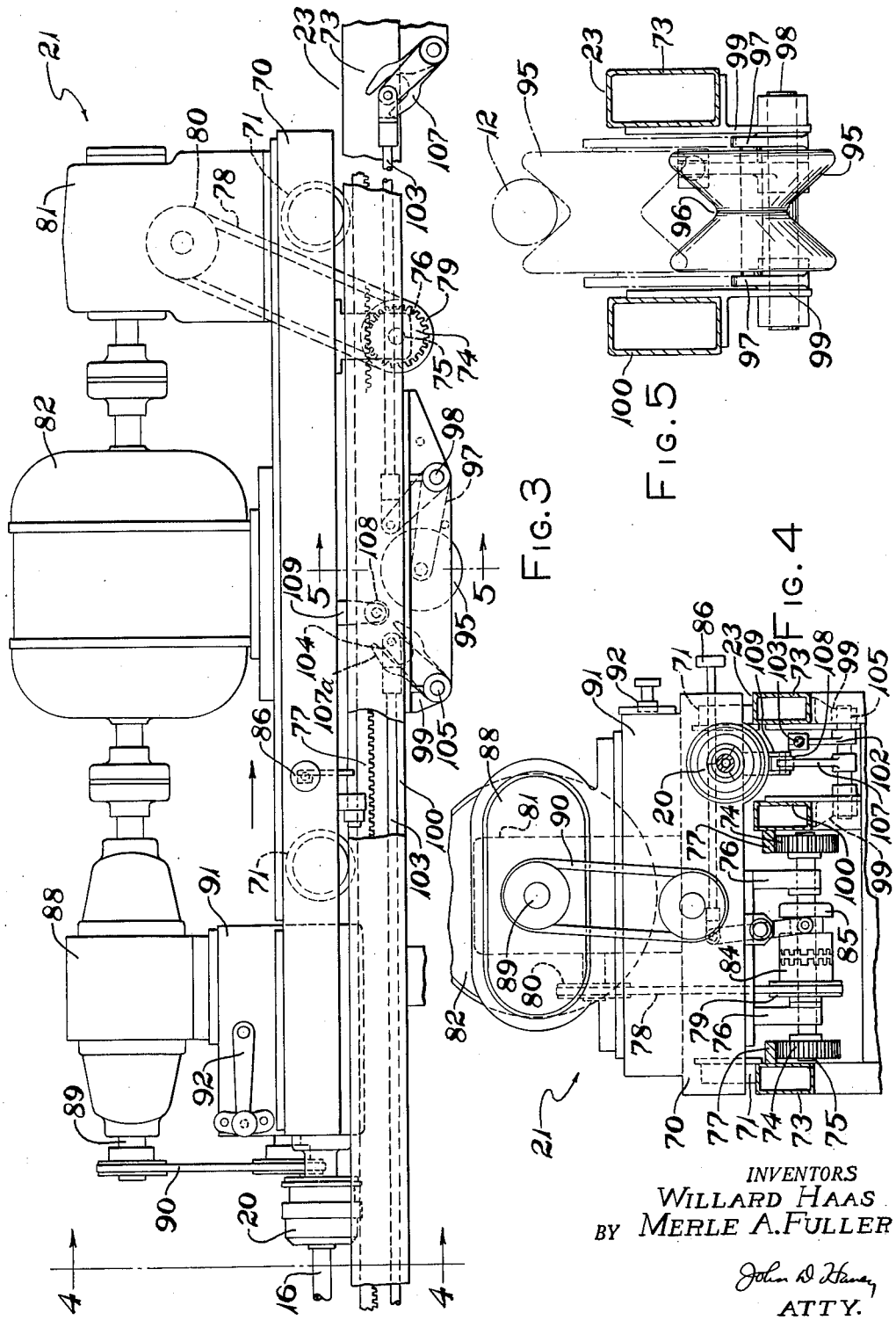

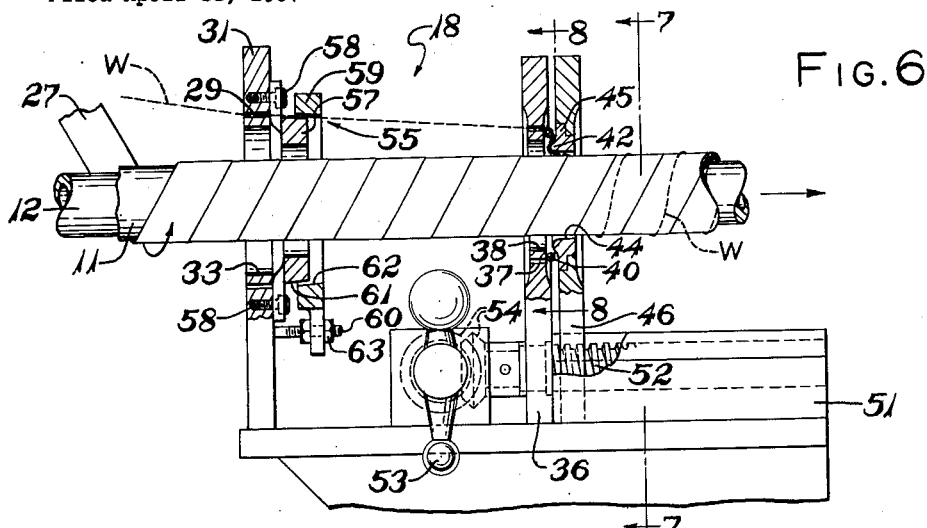
FIG. 6
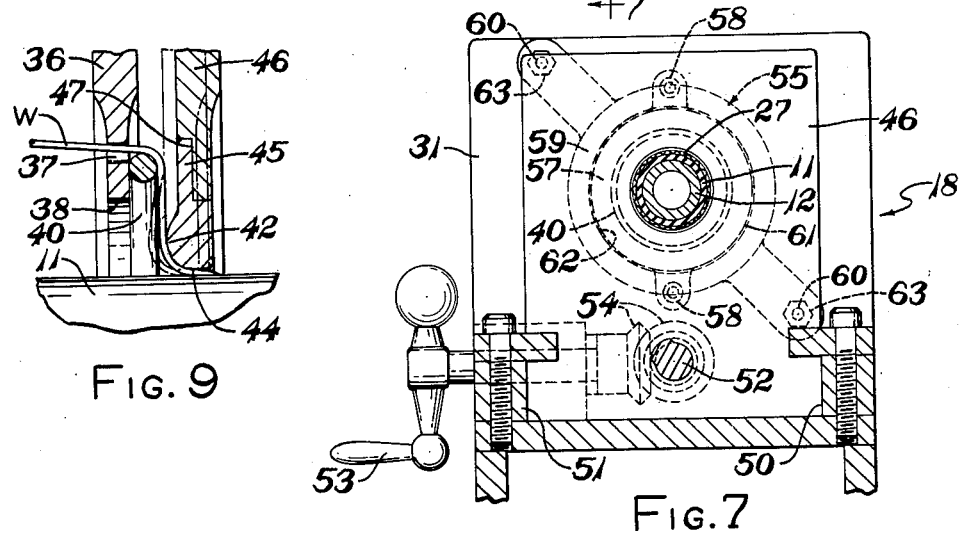
FIG. 9
FIG. 7
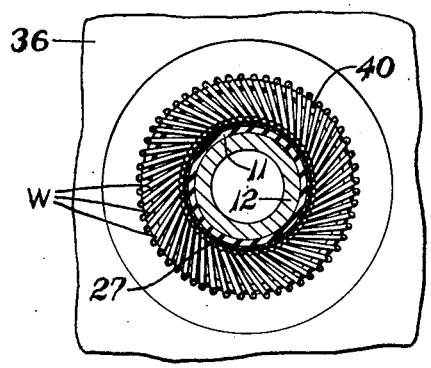
FIG. 8
INVENTORS
WILLARD HAAS
BY MERLE A. FULLER
John W Haney
ATTY.

INVENTORS
WILLARD HAAS
BY MERLE A. FULLER
ATTY.

United States Patent Office 3,037,343
Patented June 5, 1962

3,037,343
METHOD AND APPARATUS FOR MANUFACTURING HOSE
Willard Haas, Cuyahoga Falls, and Merle A. Fuller, Barberton, Ohio, assignors to The B. F. Goodrich Company, New York, N.Y., a corporation of New York
Filed Apr. 11, 1957, Ser. No. 652,287
14 Claims. (Cl. 57—9)

This invention relates to the manufacture of flexible wire-reinforced rubber hose which is especially suited for high pressure hydraulic systems. More particularly the invention relates to a method and apparatus for making such hose.

Rubber hose reinforced with two or more plies of resilient wires disposed in parallel helical convolutions has been found to have several significant advantages in high pressure service over similar hose reinforced with braided wire plies. Prior to this invention, however, many manufacturing problems have been encountered in making hose with helical wire plies. Wire having the requisite flexibility and tensile strength for use in such hose (e.g. "music" quality steel wire) is very fine and resilient, and as many as one hundred individual wires or more are integrated into parallel helical convolutions to form each ply. When these wires are wrapped helically on a hose carcass by lathe-wrapping or by the conventional techniques for applying textile servings, it has been found that the resulting hose cannot be cut without having the wire ends at the severance plane flare wildly from their respective plies, making it difficult or impossible to assemble a fitting to the cut end. Moreover, it has been very difficult prior to this invention to wrap these stiff wires in uniform convolutions in a ply. Frequently, some of the individual coils have tended to jump over adjacent coils causing humps and other irregularities in the ply. Still another problem in making hose with helical wire plies has been to avoid mutilating the underlying portions of the hose carcass as the wire plies are wrapped.

The present invention provides a practical method and apparatus for manufacturing hose with helical wire plies which avoids the foregoing problems. According to this invention the multitude of individual fine resilient wires which are integrated into each ply are subjected to cold working before they are wrapped on a hose carcass. This working imparts to each wire a permanent set in a helical convoluted shape, the neutral lay of which is a size corresponding approximately to the size of the convolutions in which the wires are to be wrapped on the hose carcass. When the wires are then wrapped on the hose carcass they tend to remain in even regular convolutions in which they are wrapped during the subsequent steps in the hose-building procedure and they do not tend to flare wildly when the finished hose is cut. The term "neutral lay" as used herein means the shape an individual wire takes when free from any external deforming forces. As used herein the term "diameter" with reference to the neutral lay means the outer diameter of the neutral lay from one side of the helix to a plane surface on which the opposing portions of the convolutions rest.

The invention provides for conveniently regulating the size of the neutral helical convoluted shape imparted to the wires with adequate accuracy so that the plies of the finished hose may have certain desired resilient characteristics. For example, the wires may be shaped and wrapped so that the wire plies of the finished hose will be essentially neutral in the hose carcass. Alternatively, one or more of the wire plies of a hose may be formed so that they tend to exert a resilient radial compressive force on the portions of the hose carcass surrounding the plies, either by tending to expand relative to the underlying carcass portions, or to grip the underlying carcass portions. The characteristics of the finished hose in these respects will depend on the nature of the service for which it is intended and on the particular types of fittings or couplings to be assembled with the hose.

In accordance with this invention the multitude of wires which are integrated to form each ply are trained from a wire-supply source under substantially uniform equal tension through a wire-shaping mechanism which surrounds the hose carcass at the point where the wrapping is effected, and which gathers the wires into an array converging concentrically toward the hose carcass. As the wires pass progressively through the wire-shaping mechanism, they are progressively deflected about surfaces of the wire-shaping mechanism to impart to each wire a permanent helical convoluted shape of desired size. The wires are subjected to two principal forms of cold working by the wire-shaping mechanism; they are deflected in a bending plane which tends to impart to them a permanent curvature conforming to the ultimately desired neutral diameter, and they are also subjected to torsional twisting to impart to them a curvature of approximately the ultimately desired neutral pitch. The wires are progressively shaped by the wire-shaping mechansim and then wrapped on a partly-built hose carcass supported on a suitable mandrel. Means are provided for producing relative movement between the mandrel and the wire-shaping mechanism in a direction circumferentially and axially of the mandrel so that the array of wires is pulled progressively through the shaping mechanism and wrapped helically on the hose carcass.

The invention will be further described with reference to the accompanying drawing in which is shown one form of apparatus constructed in accordance with and embodying the invention and which is useful for practicing the method of this invention.

Figure 2:
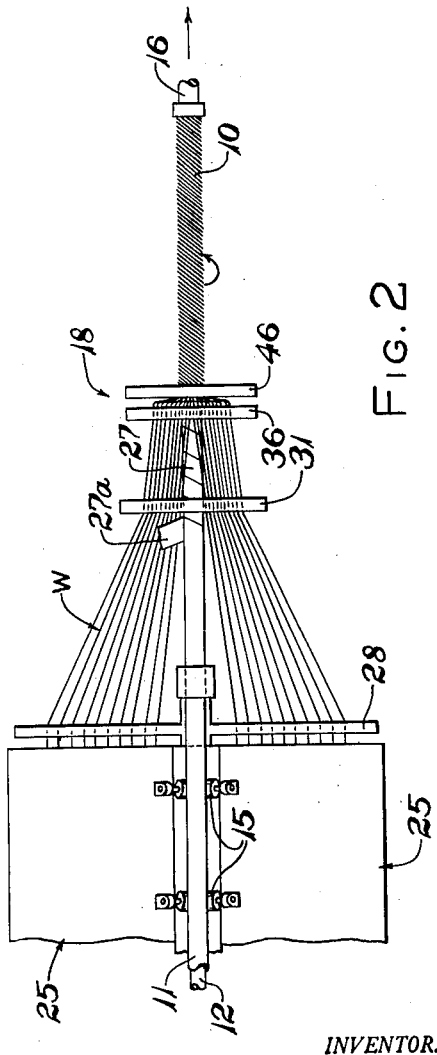
Figure 10:
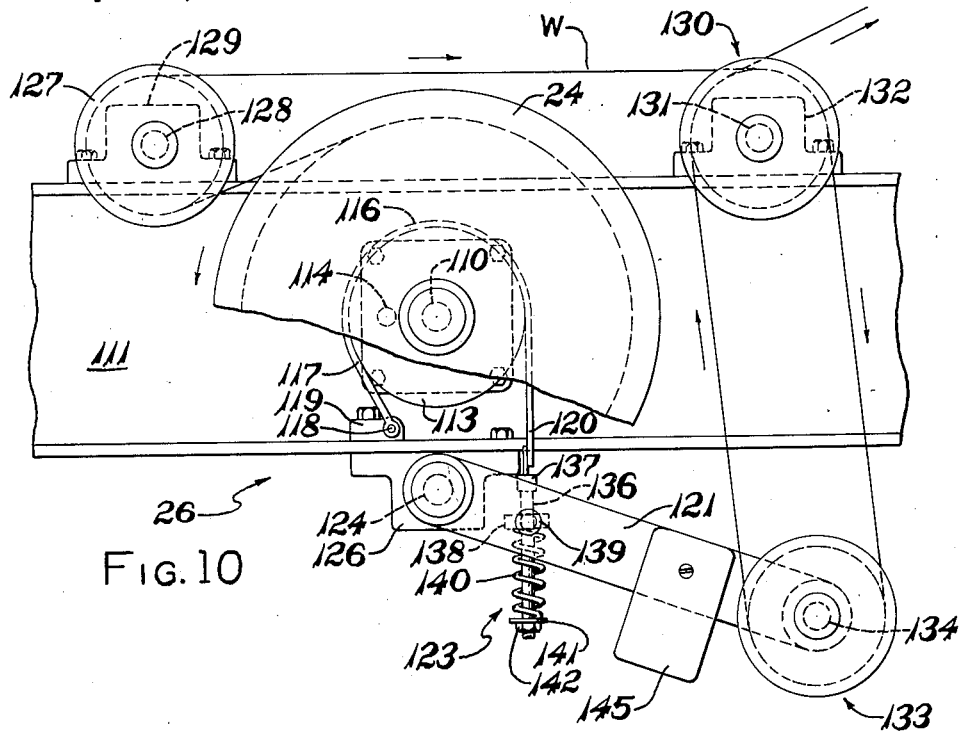
Figure 11:
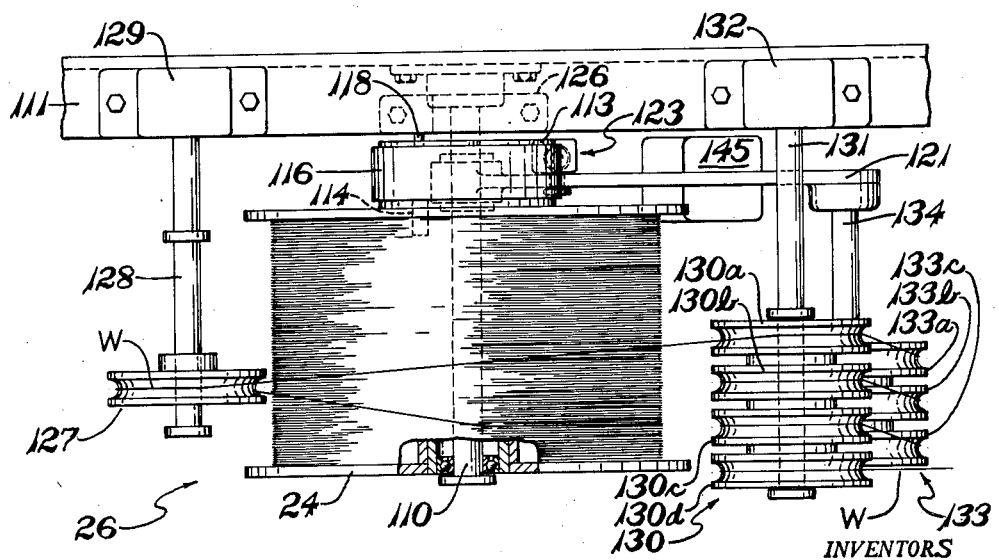

In the drawings:
FIG. 1 is an elevational view in semi-schematic form showing the general arrangement of the apparatus;
FIG. 2 is a view taken along the line 2—2 of FIG. 1 but drawn on a larger scale than FIG. 1;
FIG. 3 is a side elevation showing details of the truck mechanism for operating the mandrel;
FIGS. 4 and 5 are detailed views taken along the lines 4—4 and 5—5, respectively, of FIG. 3;
FIG. 6 is a side elevation, partly in section, showing details of the wire-gathering plates and the wire-shaping mechanism;
FIGS. 7 and 8 are detailed views taken along the lines 7—7 and 8—8, respectively, of FIG. 6;
FIG. 9 is an enlarged fragmentary view showing details of the surfaces of the wire-shaping mechanism over which the wires are bent to impart a helical neutral lay;
FIG. 10 is a side elevation showing details of a preferred let-off apparatus; and
FIG. 11 is a plan view of the let-off shown in FIG. 10.

In FIG. 1 the parts of the apparatus are shown in their relative positions for the initial stages of wrapping a wire ply 10 on a partly built hose carcass. The "partly built hose carcass" in FIG. 1 and in FIGS. 6–9 consists of an unvulcanized rubber tube 11 supported on a mandrel 12. While the following description relates particularly to wrapping the first wire ply 10 on the tube 11, it will be understood that essentially the same procedure is used for wrapping each additional wire ply about a carcass in which wire plies or other material have previously been wrapped.

The principal parts of the apparatus of FIG. 1 in addition to mandrel 12, include a wire-shaping mechanism 18, a truck 21, and wire-supply creels 25. At the start of a ply-wrapping operation, the mandrel 12 with the tube thereon is supported horizontally in the apparatus by cradle rollers 15 (FIG. 2) with the forward end 16 of the mandrel projecting through the wire-shaping mechanism 18 into a chuck 20 carried by the truck 21. The multitude of individual wires W for each ply are individually trained from their respective supply spools 24 in creels 25 (see also FIGS. 10 and 11) through the shaping mechanism 18 and the ends of these wires are taped or otherwise attached to the hose carcass near the forward end 16 of the mandrel at the chuck. The truck 21 is movable horizontally along a trackway 23 to pull the mandrel axially through the shaping mechanism 18, and also is operable to rotate the chuck 20 so that the mandrel in turn is rotated as it is axially advanced. Thus by the movement of the mandrel the wires are progressively pulled from their respective supply spools through the wire-shaping mechanism 18 and are progressively wrapped in helical convolutions upon the underlying adjacent portions of the hose carcass on the mandrel. The chuck 20 is reversible so that successive wire plies may be wrapped in helices of opposite hand.

The spools 24 of wire are arranged in two creels 25 flanking the mandrel supports 15 rearwardly of the wire-shaping mechanism 18. Each spool 24 has associated with it a let-off apparatus 26 (FIGS. 10 and 11, hereinafter described) for maintaining a predetermined uniform tension in the wire as it is payed from the spool.

At the front end of each creel 25 a horizontal spacing comb 28 is provided which spaces the wires in a horizontal plane as they emerge from the creels. The wires are deflected upwardly over the comb 28 and then pass through a series of holes 29 in a vertical gathering plate 31 (see FIG. 6) mounted on the main frame of the machine and having a central opening 33 through which the mandrel extends. The guide holes 29 of this plate are arranged in a circle concentric with the mandrel so that the wires are gathered into a generally cylindrical array about the mandrel 12 as they pass through gathering plate 31. The guide holes 29 are belled or rounded at their edges to prevent the wires from being scraped sharply across the rim of the holes.

The wire-shaping mechanism 18 (see FIG. 6) includes a wire-spacing plate 36, and a guide plate 46 which are parallel to each other. Wire spacing plate 36 has a central opening 38 through which the mandrel extends. Guide plate 46 includes a central opening 44 coaxial with opening 38 in which a die 45 is mounted closely surrounding the mandrel. Between the plates 36 and 46 there is a toroidal shaped ring 40 which surrounds the mandrel and, as is subsequently explained, the ring 40 is supported concentrically about the mandrel by the array of wires passing through mechanism 18.

The wires W are trained to spacing plate 36 from the gathering plate 31 and are threaded through a series of holes 37 in the spacing plate 36 which holes have rounded edges and are arranged in a circle concentrically about the mandrel. The circle of holes 37 is of slightly smaller diameter than the circle of holes 29 in the gathering plate 31 so that the array of wires is converged somewhat as it passes through the spacing plate 36. While the wires need not necessarily be uniformly spaced apart as they pass through the gathering plate 31, they are preferably uniformly spaced by the holes 37 of spacing plate 36.

Immediately after the wires pass through the holes 37, the wires are all deflected about the outer periphery of the toroidal ring 40 and then they are trained convergingly through the die 45 as best shown in FIGS. 8 and 9. For clarity, FIG. 9 shows a single wire (drawn with an exaggerated diametrical size) deflected about ring 40. As indicated in FIG. 9 each wire is warped along a generally elliptical (i.e. non-radial) arc on the surface of ring 40 and then is deflected in a plane oblique to its plane of bending on the ring 40 around the smooth convex surface of an annular boss 42 at the mouth of the central opening 44 through the die 45 supported in the movable guide plate 46. As the array of wires converges through opening 44, the surface of the boss 42 of die 45 guides the wires into tangential engagement with the hose carcass on the portion of the mandrel then within the opening 44. Since the die 45 closely surrounds the hose carcass, the wires are firmly supported by the die surfaces until the wires are very nearly to the point where they pass into contact with the carcass. The convex curvature of the wire-supporting surface of the boss 42 blends smoothly into the curvature of opening 44 to provide such support for the wires. The wires are wrapped about the portion of the hose carcass enclosed within the opening 44 of the die 45.

The die 45 as shown in FIG. 9 is removably seated in an annular rabbet 47 at the center of guide plate 46. The die may be easily removed after each ply is wrapped and another die substituted having an opening 44 of a size conforming to the outer diameter of the next wire ply.

The ring 40 is supported entirely by the array of wires deflected over its periphery and is normally pressed by the array against the stationary spacing plate 36. The circumferential length of the outer periphery of the ring is such that its outer periphery lies slightly inside the locus of centers of the holes 37 so that the wires extend directly over the ring without being scraped across the rims of these holes.

The guide plate 46 is supported for adjustment axially of the mandrel in a guideway 50 (FIG. 7) on the main frame of the apparatus in which a base member 51 of the plate is slidably positioned. The plate 46 is in threaded engagement with a screw 52 journaled in spacing plate 36 which is rigidly secured to the frame. The screw may be rotated to shift plate 46 toward and away from ring 40 and plate 36 by a hand crank 53 through bevel gears 54. As hereinafter explained by this adjustment the tension in the wires can be widely varied, and this adjustment therefore provides a convenient means of regulating the size of the neutral helical curvature imparted to the wires by the wire-shaping mechanism.

To maintain the tension on the array of wires imposed by the let-off apparatus of FIGS. 10 and 11 during a period when the array of wires are disengaged from the mandrel, such as at the conclusion of laying a ply, a brake mechanism 55 is provided on the gathering plate 31 as shown in FIG. 6. The brake 55 includes an inner annular rigid ring 57 secured to the forward face of the plate 31 by bolts 58 and an outer annular ring 59 secured to the comb plate 31 for adjustment axially of the mandrel by adjusting studs 60. The inner ring 57 has a smooth outer peripheral surface 61 which is tapered parallel to the array of wires extending forwardly from the gathering plate 31 and which is concentric with a correspondingly tapered internal surface 62 on outer ring 59. When the outer ring is adjusted in a position away from the plate 31 (e.g. see FIG. 6), there is radial clearance between the surfaces 61 and 62 of the inner and outer brake rings to permit unimpeded movement of the array of wires between these rings. By tightening the nuts 63 on studs 60 the outer ring may be displaced toward the comb plate to clamp the array of wires tightly between the surfaces 61 and 62.

Details of the truck 21 which is operable to rotate and axially advance the mandrel 12 are best shown in FIGS. 3–5. The truck includes a rectangular frame 70 supported by four flanged wheels 71 located near the corners of the frame. The wheels engage a pair of laterally-spaced horizontal rails 73 (FIG. 4) which form the trackway 23. The truck 21 is propelled along the trackway by a pair of gears 74 mounted at the ends of a drive shaft 75 suspended from the bottom of frame 70 by journal brackets 76, each gear 74 being meshed with an adjacent stationary rack 77. The racks 77 are mounted on the trackway 23 parallel each other between the rails 73 and extend longitudinally of the trackway. The gears 74 for straight tooth spur gears and are mounted so that the teeth of one gear are arcuately off-set from the teeth of the other so that the truck has a more uniform motion along the rails 73. The gears 74 are rotated to advance the truck along the trackway by a chain 78 engaged with a sprocket 79 (see FIG. 4) on shaft 75 and with another sprocket 80 on a gear transmission unit 81 mounted on the frame 70 and coupled to one end of the rotor of a motor 82.

The sprocket 79 is rotatably mounted on shaft 75 and secured to a rotatable clutch member 84 which loosely surrounds shaft 75 and which is engageable by a driving clutch member 85. The latter member 85 is splined to shaft 75 and may be operated by a control rod 86 to engage clutch member 84 to transmit driving power from the chain 78 to the drive shaft 75, thereby advancing the truck along the trackway.

The chuck 20 is rotated by the truck motor 82 through a variable-speed gear transmission unit 88 on frame 70 to which the motor 82 is coupled. The power output shaft 89 of the variable-speed transmission 88 is connected through a chain drive 90 with a reversing gear mechanism 91 which in turn rotates the chuck 20 in the desired direction. Details of the reversing gear mechanism are omitted from the drawing, the mechanism merely consisting of gears which may be shifted by an external lever 92 to drive the chuck either clockwise or counterclockwise so that the wire may be laid in either right or left hand helical convolutions upon the mandrel. The lever 92 includes a neutral position (the horizontal position shown in FIG. 3) in which the chuck is non-rotatable so that the mandrel may be axially advanced without rotation if desired. The chuck 20 is preferably a standard commercial air-actuated collet chuck.

To support the portion of the mandrel between the wire-shaping mechanism 18 and the chuck 20 as the truck is moved progressively further and further from the shaping mechanism the trackway 23 is provided with a series of idler rollers 95 (note FIGS. 1, 3 and 5) which are normally retracted between the rails 73 but which may be elevated in succession to engage the mandrel by the progressive movement of the truck along the trackway. Each roller 95 has a central peripheral groove 96 (FIG. 5) which serves as a trough to receive the mandrel as indicated in chain dotted lines in FIG. 5 when the roller is in its elevated position. The rollers 95 are spaced apart from each other lengthwise of the trackway at a distance equal to about the length of the truck 21. Each roller is rotatably supported between a pair of links 97 (FIG. 3) which are secured to a pivot pin 98 (FIG. 5) journaled at its ends in a pair of brackets 99. One bracket 99 is secured to the bottom of the rail 73 nearest the mandrel, and the other bracket 99 is secured to an auxiliary frame member 100 of trackway 23 parallel to the rails.

Each roller 95 may be swung arcuately upward from its retracted position by a lever 102 (FIG. 4) secured to the pivot pin 98 and which is operated by a push rod 103 pivotally connected to the upper end of the lever 102 and extending longitudinally of the trackway in the direction of movement of the truck. The opposite end of each push rod 103 terminates at a lever 104 which is secured to a pivot pin 105 journaled in the brackets 99 for the next succeeding roller 95 as shown in FIG. 3. To the latter pivot pin 105 there is secured an upwardly extending forked lever 107 which is disposed in the path of movement of a small cam roller 108 on a bracket 109 positioned below the frame of the truck.

In the retracted position of the rollers 95, the forked lever 107 slants upwardly and toward the casting mechanism as indicated in FIG. 1. As the truck advances along the trackway, its roller 108 successively engages the forked levers 107 and swings these levers 107 arcuately away from the casting mechanism 18 into the upwardly slanting position shown in FIG. 3 for lever 107a. This movement of the lever 107 shifts the connecting rod 103 and in turn the roller-supporting levers 97 to raise the troughed rollers 95 upward to engage the mandrel and provide support for it. In this manner each roller 95 is elevated in succession into supporting relation with the mandrel as the truck successively engages the forked levers 107 for the respective rollers 95. The rollers 95 are lowered or retracted in succession in the same manner when the truck is moved in a reverse direction to reposition it toward the casting mechanism 18.

A preferred let-off apparatus is shown in FIGS. 10 and 11 and is preferably associated with each supply spool 24 to maintain uniform tension in each wire as it is trained through the casting mechanism. A let-off of this type is the subject of a copending application of Ralph Cooper, Serial No. 615,155, filed October 10, 1956, now Patent No. 2,920,840. It includes a spindle 110 projecting from a frame member 111 on which a supply spool of wire W is rotatably positioned. The spindle 110 includes a brake drum 113 axially engageable with the spool by a stud 114 and which is supported on the spindle for rotation with the spool 24 as wire from the spool is payed off. During periods when wire is not being payed from the spool 24, rotation of the spool is restrained by a flexible brake band 116 having one end 117 anchored on a stud 118 secured to the frame by a bracket 119. The brake band peripherally engages the brake drum 113 and has its opposite end 120 resiliently secured to a lever 121 by a spring mechanism 123. The lever 121 is pivotally mounted on a pintle 124 projecting from a pillow block bracket 126 on the frame. Wire is payed off the spool to rotate the spool so that the tension resulting in the brake band 116 from the rotation of the spool acts directly against the spring mechanism 123, thereby tending to swing the lever 121 upwardly about its pintle 124.

The wire is trained from the spool 24 to a first sheave 127 rotatably supported for axial movement on a spindle 128 projecting from a pillow block 129 on the frame, and then in a reverse bend over the first sheave 127 toward a set of second sheaves 130. The bend imparted to the wire by the first sheave 127 is reverse to the direction in which the wire is coiled on the spool.

The second sheaves 130 are supported for independent rotation coaxially of each other on a common spindle 131 from a pillow block 132 on the frame. The wire from the first sheave is directed over the innermost sheave 130a of the set of second sheaves and then is trained downwardly and around the corresponding innermost sheave 133a of a set of third sheaves 133 which are supported for independent rotation coaxially of each other on a spindle 134 projecting laterally from the end of lever 121. The wire is then looped in successive convolutions about the remaining sheaves of the second and third set, 130b, 133b, 130c, etc. and from the outermost second sheave 130d it is trained forward to the horizontal spacing comb 28 shown in FIG. 1.

The spring mechanism 123 includes a stud 136 having a head 137 secured to the end 120 of the brake band. The stud extends slidably through at suitable opening in a small plate 138 pivotally mounted by a gudgeon 139 in the lever 121. The head 137 of the stud is biased toward the plate 138 by a spring 140 which surrounds the stud and which is compressed between the opposite side of the plate 138 and a washer 141 attached to the lower end of the stud by a nut 142. The lever 121 is normally urged downward by a weight 145 engaged with the lever near the third set of sheaves 133 and by its own weight against the resistance of spring 140 to maintain tension in the wire trained about the second and third set of sheaves.

The lever 121 is shown in FIG. 10 in about the position it normally occupies when the truck 21 is inactive. Thus, when wire is not being payed from the spool 24, the weight of the lever 121 urges the third sheaves 133 downwardly, the lever compressing spring 140 and snubbing the brake band 116 tightly around the brake drum 113 to prevent rotation of the spool 24 on spindle 110. When the truck 21 is activated to pull wire from the spool, initially the spool remains snubbed by the brake band and a portion of the wire looped in convolutions about the sheaves 130 and 133 proceeds forwardly toward the casting mechanism 18. In this manner the lever 121 is swung gradually upwardly relieving the load on spring 140 so that the snubbing engagement of brake band 116 is gradually relieved and the spool 24 is released for free rotation on the spindle 110. Because the rotation of the spool when paying out wire is counter clockwise, as shown in FIG. 10, the incipient rotational movement of the spool through the brake band 116 also exerts an upward force on lever 121 tending to disengage the brake band from the brake drum. Thus the restraining influence of the brake band is practically instantaneously relieved when the spool starts to rotate, making the let-off particularly sensitive.

The wires are normally pulled from their respective spools at a uniform speed as a wire ply is laid on the mandrel. Under these conditions the lever 121 "floats" in an elevated condition with the brake band 116 entirely free of the brake drum 113. Upon stopping the truck, or under other circumstances in which the wire feeding speed is suddenly decelerated thereby resulting in a reduction in tension in the wire, the arm 121 will immediately drop downward tightening the brake band 116 about the drum 113 to snub the rotation of the spool. The shock of the downward movement of lever 121 is cushioned by spring 140 and the braking force is gradually applied to the spool so that shock forces are not transmitted to the wire which might result in breakage of the wire. The lever 121 exerts a substantially uniform tension force on the wire at any position of the lever in its path of movement. The tension in the wire may be varied appropriately by the size of the weight 145 and/or the position of this weight on the lever, or the number of sheaves used.

*Operation*

In the operation of this equipment, the truck 21 is initially positioned at the left end of the trackway 23 (see FIG. 1) near the wire-shaping mechanism 18 at the start of the ply-wrapping procedure. A mandrel 12 with an unvulcanized rubber core tube 11 sleeved over it and with the ends of the tube taped to the mandrel is then positioned on the troughing rollers 15 between the creels 25. The forward end 16 of the mandrel is inserted through the central opening 33 of the wire-gathering plate 31; then through the central openings 38 and 44 of the plates 36 and 46, respectively, and also through the ring 40; and then it is locked in the chuck 20 of the truck 21. The external surface of the tube is then preferably cleaned with a suitable solvent to make the surface of the tube clean to secure adhesion to the reinforcement to be applied.

The first wire ply 10 is preferably wrapped over a loosely woven cloth mesh covering 27 (FIG. 6) which encloses the tube 11 to protect the tube from cutting and mutilation by the wire. The covering 27 is conveniently in the form of a narrow tape 27a which is wound in abutting or lapping convolutions about the tube 11 in the same operation in which the wire ply 10 is wrapped. A roll of fabric tape 27a for this purpose is supported in a roll on a spindle 27b rearward of the shaping mechanism 18 and is looped about and attached to the tube near the forward end 16 of the mandrel. Then the wires W are individually threaded through their respective holes 29 in the gathering plate 31, between the brake rings 57 and 59, and then through the shaping mechanism 18 as previously described in connection with FIGS. 6–9. The wire ends are then pulled out a short distance along the mandrel and wound in a spiral along the tube 11 in the direction in which wires of the ply are to be wrapped. Then the wires are taped or otherwise fastened to the forward end 16 of the mandrel over the fabric tape 27.

To actuate the truck 21, the lever 92 is shifted to rotate the chuck 20 in the direction in which the convolutions of wire are to be laid on the mandrel, and simultaneously, the rod 86 is operated to engage clutch members 84—85 (FIG. 4) so that the truck proceeds to move down the trackway 23 pulling the mandrel axially as the mandrel is rotated. As the truck proceeds along the trackway its lower cam roller 108 successively engages the forked levers 107 to raise in succession each of the idler rollers 95 to support the portion of the mandrel on which the wires have been laid.

The combined rotary and axial movement of the mandrel pulls all the wires through the shaping mechanism 18 so that they are wrapped on the mandrel over the tube and protective fabric in parallel substantially laterally-abutting helical convolutions in the direction in which the mandrel is rotated. The pitch of the wrapped wires may be accurately adjusted by regulating the rotational speed of the mandrel by the variable-speed transmission 88 which drives the chuck.

The initial static tension in each wire is established by the force exerted on each wire by the lever 121 of its respective let-off device as shown in FIG. 10. Additional tension is imparted to the wires by adjusting the movable guide plate 46 of the shaping mechanism 18 to shape the wires to permanent neutral helical curvature of the size desired.

The truck proceeds along the trackway 23 and is stopped when the rearward end of the mandrel reaches a position in front of the gathering plate 31. Then the outer brake ring 59 is adjusted on the studs 60 to engage the array of wires with the inner ring 57 to hold the let-off tension on the wires. Then the wires in front of the shaping mechanism 18 are taped to the mandrel, and cut off in front of the movable plate 46. The truck may then be driven reversely to move the mandrel axially backward through the shaping mechanism to its original starting position, or the mandrel may be disconnected and repositioned as previously explained to receive a second wire ply concentric with the wire ply initially laid. Usually in production a number of mandrels are run in the foregoing manner to receive a first wire ply 10, before the die 45 and settings are changed for applying another wire ply of these same mandrels. Preferably a second wire ply will be insulated from the first ply by a layer of rubber or rubber-treated fabric (not shown) which is preferably applied in the form of a tape in the same manner that fabric tape 27 is wrapped about the mandrel. In applying the second wire ply the rotational direction of the mandrel will be reversed so that the helical direction of the wire plies alternates in successive plies. As many additional wire plies as desired may be built up upon the mandrel by repeating the foregoing procedure for each ply, each ply being insulated from the preceding by a layer of rubber or rubber-treated fabric. The resulting assembly may be cured in open steam vulcanizers either exposed or encased in lead or a textile wrapper or by other conventional methods of curing hose.

Normally the tube 11 will be a rubber material in unvulcanized condition but aged sufficiently to render it firm. For hydraulic systems using oil as the fluid pressure medium, neoprene or nitrile rubber compounds may be used advantageously for the tube 11, and for the insulating layers between successive wire plies. The term "rubber" as used herein includes natural rubber and the various synthetic materials having or which may be compounded to impart the characteristic flexibility and extensibility of rubber.

Wires which may be used advantageously in making this type hose are preferably monofilamentary high-tensile cold-drawn spring steel wire. The so-called "music" quality steel wire having a diameter ranging from about 0.010 inch to about 0.047 inch and a tensile strength at the yield point of about 200 to 425,000 pounds per square inch may be used. The wire may be ordinarily used in the form in which it is received from its manufacturer, but if the wire is excessively greasy or dirty it may be passed through a suitable washing solution.

In the foregoing description of the wire-shaping mechanism 18, it is explained that each wire is shaped into a permanent helical coil by bending it under substantial tension over ring 40, and then deflecting it about boss 42 and through the die 45 as it is wrapped on the hoses. Experience with this equipment indicates that for a wire of particular size, the diameter of the resulting neutral helical coil into which the wire is shaped is principally influenced by the tension in the wire as it is shaped, and by the radial cross-sectional curvature of the surface of ring 40 about which the wire is bent.

The radial cross-sectional curvature of the wire-engaging surfaces of ring 40 is such that each wire is deflected substantially beyond its elastic limit as it is bent over ring 40. On the other hand, the radial cross-sectional curvature of the wire-engaging surfaces of boss 42 on die 45 is such that the bending imparted to the wire does not exceed its elastic limit. Accordingly, the curvature of the wire-engaging surfaces of boss 42 is of very much greater radius than that of ring 40. However, as the wire is pulled across boss 42 and into die 45, it is apparently twisted and cold worked to impart the pitch in the resulting coil. In general, then, it is believed that the tension level and the bending over ring 40 establishes the diametrical size of the resulting coil, whereas the working of the wires over boss 42 and through die 45 establishes the pitch of the resulting coil.

It has been found that the diameter of the neutral coil formed from wire of a given size by the mechanism 18 can be radically changed by varying the tension in the wire. From FIG. 9 it will be evident that by adjusting plate 46 leftward toward ring 40, a greater length of the wire is warped about the ring 40 and boss 42. Adjustment in this direction therefore greatly increases the tension in the portion of the wire in mechanism 18 and materially intensifies the cold working imposed on the wire as it is deflected. The diameter of the neutral coil is decreased as plate 46 is adjusted toward ring 40 and, vice versa. This adjustment also has some effect on the pitch of the coil.

The diameter of the neutral coil can be similarly decreased by using the let-off 26 to apply additional tension in each wire but it is usually much more convenient to regulate the neutral diameter of the resulting coil by adjusting the position of plate 46. Also, this adjustment effects a uniform equal tension change in all the wires simultaneously.

Another way of varying the diameter of the neutral coil formed by the shaping mechanism is to substitute rings 40 of different radial cross-sectional size. A particular wire under a given tension can be formed into a neutral coil of smaller diameter by using a ring 40 of smaller radial cross-sectional size, the comparison being relative to any arbitrarily selected ring 40. Thus, a tighter or smaller diameter coil is made by bending the wire more sharply over ring 40. In any event, the radial cross-sectional size of the ring 40 should be small enough so that the elastic limit of the wire in bending is exceeded as the wire is bent over the ring. Changing the radial cross-sectional size of the ring 40 has little or no effect on the pitch of the resulting neutral coil.

For a ring 40 of a particular radial cross-sectional size, preferably the toroidal radius of the ring (the radius of the ring from its axial center out to the surface about which the wires are deflected) is as small as possible but of sufficient size to permit adjustment of plate 56 to a position in which boss 42 of the die 45 projects inside the region bounded by the ring as indicated in chain dotted lines in FIG. 9. This gives a wide range of tension adjustment and at the same time the use of a ring of comparatively small toroidal radius minimizes the possibility of the wires becoming snarled or displaced as they converge into die 45. The use of rings 40 of larger toroidal radius tends to effect a slight reduction of the pitch of the resulting coil and may be used if a short pitch coil is desired, but accurate placement of the wires is more difficult with larger radius rings.

The use of a floating ring 40 has many practical advantages in that such a ring is easily and inexpensively made. Also, when the helical direction of the wrapped convolutions is to be reversed, the wires easily reorient themselves on the surface of the ring. The use of a floating ring also tends to equalize minor differences in tension in the various wires.

The diameter of the forming die 45 is preferably such that it allows rotational clearance of the hose carcass with the wires wrapped thereon as the mandrel is advanced through the die 45. The reason for this is primarily to achieve accurate placement of the wires. A die opening very much larger than the hose carcass and the ply wires has little effect on the size of the neutral convolutions into which the wire is formed but makes accurate placement of the wires more difficult.

It is of particular importance in making this hose to maintain a uniform equal tension in all the wires as the wires are pulled through the shaping mechanism 18. The let-off apparatus 26 described with reference to FIGS. 10 and 11 serves this function remarkably well. As previously explained, each let-off 26 imposes an initial tension in its respective wire and additional tension is imposed in the wires by the adjustment of movable plate 46.

For making hose having an internal diameter ranging from about 3/16 inch to 1 inch, the components of the wire-shaping mechanism 18 are preferably in the following proportions: The radial cross-sectional diameter of ring 40 is in the order of about ten times the diameter of the wire used. The toroidal diameter of the ring 40 varies from about 1½ inches to about 3½ inches, depending on the number of ply wires used. The opening 44 in die 45 preferably allows only rotational clearance of the hose carcass therein after the ply is applied. The radial clearance between the internal surface of die opening 44 and the outer diameter of the wrapped ply is preferably about 1/64 inch. The radial cross-sectional shape of the wire-supporting convex surface of the boss 42 is preferably formed on a radius about equal to or greater than the radius of the opening 44. This surface need not be a true radius but it is ordinarily convenient to form it on a radius. The curvature of this surface of boss 42 is very much less than the cross-sectional curvature of the peripheral surface of ring 40. Each let-off apparatus 26 is usually adjusted to exert a tension on its respective wire of about 1 to 5 pounds.

By way of example, a hose of ½ inch internal diameter is made with four helically wrapped wire plies, each ply containing 99 steel "music" quality wires of about .012 inch diameter. A ring 40 is used having a ⅛ inch radial cross-sectional diameter and 1¾ inches in toroidal diameter at its peripheral surface about which the wires are deflected. A tension is exerted on each wire by its let-off of about 1 to 2 pounds. For each ply the converging die 45 has an opening 44 formed to a diameter $\frac{1}{32}$ inch greater than the outer diameter of each particular ply. The wire-supporting surface of boss 42 of die 45 is formed on a radius of about ⅜ inch. The wire plies are wrapped concentrically upon a central rubber tube of ½ inch internal diameter and $\frac{21}{32}$ inch outer diameter. The directions of the helices are of opposite hand in successive plies. Each ply is wrapped in helices having a pitch of 1⅝ inches. The first wire ply is shaped so that its neutral diameter ranges from about ⅝ inch to about ⅞ inch and is wrapped in convolutions having an outer diameter of about $\frac{11}{16}$ inch. The second wire ply is shaped so that its neutral diameter ranges from about ⅝ inch to ⅞ inch and is wrapped in convolutions having an outer diameter of about $\frac{47}{64}$ inch. The third wire ply is shaped so that its neutral diameter ranges from about ⅝ inch to $\frac{13}{16}$ inch and is wrapped in convolutions having an outer diameter of about $\frac{49}{64}$ inch. The fourth wire ply is shaped so that its neutral diameter ranges from about ⅝ inch to $\frac{13}{16}$ inch and is wrapped in convolutions having an outer diameter of about $\frac{51}{64}$ inch. For each ply the neutral pitch ranges from a minimum of about 60% to a maximum of about 100% of the wrapped pitch. Each wire ply is separated from adjacent plies by an insulating layer of rubber or fabric which may be rubber-treated. The hose is covered with rubber and the whole is vulcanized in the customary way. Hose of this construction is entirely satisfactory from a commercial standpoint when made on apparatus of the type disclosed and in accordance with the procedure described in the foregoing.

Variations in the apparatus and in the procedures disclosed may be made within the scope of the appended claims.

We claim:

1. The method of making flexible wire-reinforced hose which comprises supporting a partly-built hose carcass of rubber and fabric, attaching to said rubber and fabric portions of the carcass a multiplicity of individual stiff highly resilient wires trained from a wire supply source, relatively rotating while longitudinally advancing the hose carcass continuously relative to the wires to pull said wires toward the hose and thereby wrap all said wires simultaneously in side-by-side parallel helical convolutions upon the hose carcass while maintaining uniform equal tension in said wires, and shaping all said wires simultaneously as they are progressively pulled toward said carcass by progressively reversely bending said wires under tension as the wires engage the hose carcass to impart to each wire a permanent helical convoluted shape having the diameter and pitch of its neutral lay not substantially exceeding the diameter and pitch of the helical convolutions in which said wires are wrapped on the hose carcass.

2. The method of making flexible wire-reinforced hose which comprises supporting a partly-built hose carcass of rubber and fabric, progressively guiding a multiplicity of individual stiff highly resilient wires in an array concentrically converging on said rubber and fabric portions of the hose carcass so that the wires engage the hose carcass at circumferentially spaced positions on said carcass, maintaining equal uniform tension in said wires, relatively rotating while longitudinally advancing said hose carcass continuously relative to said wires to pull said wires through said array toward said hose carcass, progressively shaping said wires simultaneously by reversely bending said converging portions of said wires while under tension as they are pulled toward the carcass to impart to each said wire a permanent helical convoluted shape having the diameter of its neutral lay substantially equal to the diameter of the hose carcass, and progressively wrapping said shaped wires simultaneously and continuously about said hose carcass at the location toward which the array converges in parallel side-by-side helical convolutions in a direction conforming to the helical direction in which said wires are shaped.

3. The method of making flexible wire-reinforced hose which comprises guiding a multiplicity of individual highly resilient wires from a wire supply source into an array concentrically converging toward a partly-built hose carcass of rubber and fabric, attaching the end of each wire to the hose carcass, providing continuous simultaneously relative movement in a direction both circumferentially and axially of said hose carcass between said hose carcass and said wires for pulling said wires from said wire supply source under tension and wrapping said wires simultaneously in parallel helical convolutions upon the rubber and fabric portions of the hose carcass at the location toward which the array of wires converges, the wires engaging said carcass at circumferentially spaced positions on said carcass, maintaining uniform equal tension in said wires, and shaping all said wires simultaneously in the converging regions thereof by reversely bending said regions while said regions are under tension to impart to each wire a permanent helical convoluted shape conforming substantially to the shape of the convolutions in which said wires are wrapped.

4. The method of making flexible wire-reinforced hose which comprises supporting a partly-built hose carcass, training a multiplicity of individual stiff highly resilient wires from a wire supply source into an array concentrically surrounding said hose carcass, guiding said array of wires convergingly toward said hose carcass, fastening said wires to said hose carcass, simultaneously rotating and axially advancing said hose carcass continuously relative to said array of wires for pulling said wires from said wire supply source and wrapping said wires simultaneously in parallel helical convolutions upon the hose carcass, the wires engaging the hose carcass at circumferentially spaced apart positions thereon, maintaining uniform equal tension in said wires, and shaping all said wires simultaneously in the converging region thereof by progressively bending and twisting said converging regions of said wires beyond their elastic limit while said regions are maintained under tension to impart to each wire a permanent helical convoluted shape conforming substantially to the shape of the convolutions in which said wires are wrapped.

5. Apparatus for manufacturing flexible wire-reinforced hose, the apparatus comprising means for supporting a partly-built hose carcass, wire supply means from which a multiplicity of individual highly resilient wires are trained to said hose carcass, a wire-shaping mechanism surrounding the hose carcass through which the portions of the wires adjacent the carcass are threaded, said mechanism including a first member for spacing the wires laterally of each other in a concentric array about the hose carcass, a second member having a central opening closely surrounding said hose carcass and through which the array of wires is converged and guided into engagement with the hose carcass, a toroidal ring between said first and said second members which ring is positioned within and supported by the engagement of the array of wires at the periphery of the ring and about the periphery of which ring the wires are bent as they are converged through the opening of said second member, means for maintaining uniform equal tension in all wires, and means providing relative movement in a direction both circumferentially and axially of said hose carcass between said hose carcass and said wire-shaping mechanism for pulling the array of wires through said mechanism and wrapping the wires simultaneously in parallel helical convolutions upon the hose carcass.

6. The apparatus of claim 5 in which said wire-shaping mechanism includes means for adjusting said second member and said ring coaxially of each other to vary the tension in said wires.

7. Apparatus for manufacturing flexible wire-reinforced hose, the apparatus comprising means for supporting a partly-built hose carcass to receive a wire-reinforcing ply, wire supply means from which a multiplicity of individual highly resilient wires under uniform equal tension are trained to the hose carcass, wire-shaping mechanism comprising a first wire-shaping element surrounding said hose-supporting means and having a convex smooth wire-supporting surface about which the wires are bent in an array converging toward the hose carcass, and a second wire-shaping element having an annular internal surface defining an opening concentrically embracing the hose carcass in closely spaced relation thereto through which opening the wires are converged and guided into engagement with the hose carcass, said second element having a boss at the rim of said opening with a wire-guiding surface thereon which blends smoothly into said internal surface defining said opening, the wires being bent about said wire guiding surface as they are converged through said opening, the wires being subjected to appreciably sharper bending by said first element than by said wire-guiding surface of said boss, and means providing relative movement in a direction both circumferentially and axially of said hose carcass between said hose carcass and said wire-shaping mechanism for pulling said array of wires through said mechanism and wrapping said wires simultaneously in parallel helical convolutions upon the hose carcass.

8. Apparatus for manufacturing flexible wire-reinforced hose, the apparatus comprising means for supporting a hose core tube of flexible rubber material to prevent collapse of the walls of said tube, means for converging a multiplicity of fine highly resilient wires tangentially upon said tube at circumferentially spaced positions on said tube, means for maintaining substantially equal uniform tension in all wires, means for progressively wrapping said wires simultaneously about said core tube in parallel side-by-side helical convolutions, and means for progressively reversely bending the converging portions of the wires simultaneously while said portions are maintained under tension and as the wires are progressively advanced toward the tube to impart to all wires a helical convoluted shape of substantially the same size as the convolutions in which said wires are wrapped on the core tube.

9. Apparatus for manufacturing flexible wire-reinforced hose, the apparatus comprising a mandrel for supporting a partly built hose carcass, means for advancing the mandrel axially with a hose carcass thereon, wire-supply means from which a multiplicity of individual highly resilient wires under uniform equal tension are trained to the hose carcass, a wire-shaping mechanism through which said trained wires are threaded in an array concentrically converging toward the hose carcass and through which said mandrel is adapted to be advanced axially, said wire-shaping mechanism including means for simultaneously reversely bending the converging regions of said wires while said regions are maintained under tension to impart to all the wires a permanent helical convoluted shape as the wires are drawn through said wire-shaping mechanism by the axial movement of the mandrel, and means providing relative movement between said wire-shaping mechanism and said mandrel circumferentially of said mandrel for wrapping the wires about the hose carcass in parallel helical convolutions of a size corresponding substantially to said permanent helical convoluted shape.

10. Apparatus for manufacturing flexible wire-reinforced hose, the apparatus comprising a mandrel for supporting a partly-built hose carcass, wire supply means from which a multiplicity of individual stiff highly resilient wires under uniform equal tension are trained to and attached to a hose carcass on said mandrel, wire-shaping mechanism surrounding said mandrel through which mechanism said wires are threaded in an array concentrically converging toward the hose carcass so that the wires tangentially engage said hose carcass at circumferentially spaced positions on said hose carcass, means providing relative movement between said wire-shaping mechanism and said mandrel in a direction circumferentially and axially of the mandrel for progressively pulling said wires through said wire-shaping mechanism and wrapping said wires about the hose carcass in parallel helical convolutions, and means in said wire-shaping mechanism for progressively reversely bending the converging regions of all said wires simultaneously beyond their elastic limit while said regions of the wires are maintained under tension as they are pulled through said wire shaping mechanism to impart to each wire a permanent helical convoluted shape of substantially the same size as the convolutions in which said wires are wrapped on the hose carcass.

11. Apparatus for manufacturing flexible wire-reinforced hose, the apparatus comprising a mandrel for supporting a partly-built hose carcass, wire supply means from which a multiplicity of individual highly resilient wires are trained to a hose carcass on said mandrel, wire-shaping mechanism surrounding said mandrel and through which said wires are threaded in an array concentrically converging toward the hose carcass, a truck mechanism having a chuck to releasably engage one end of said mandrel, means for rotating said chuck to rotate the mandrel fastened therein about the longitudinal axis of the mandrel, a trackway supporting said truck for translational movement toward and away from the wire-shaping mechanism, means for propelling said truck on said trackway to advance said mandrel longitudinally relative to said wire-shaping mechanism simultaneously with the rotation of said chuck for progressively pulling said wires through said wire-shaping mechanism and wrapping said converging array of wires in parallel helical convolutions about the hose carcass, means for maintaining substantially uniform equal tension in said wires, and means in said wire-shaping mechanism for progressively reversely bending the converging regions of all said wires simultaneously beyond their elastic limit and while said regions are maintained under high tension as the wires are pulled through the wire shaping mechanism to impart to each wire a permanent helical convoluted shape of substantially the same size as the convolutions in which the wires are wrapped on the hose carcass.

12. The apparatus of claim 11 which further includes means for supporting said mandrel intermediate said truck and said wire-shaping mechanism as said truck is moved progressively away from said wire-shaping mechanism.

13. The apparatus of claim 11 in which said trackway includes a series of mandrel-support rollers normally retracted from said mandrel, and means actuated by the movement of the truck for displacing said rollers in succession into supporting engagement with said mandrel intermediate said truck and said wire-shaping mechanism.

14. The apparatus of claim 11 which further includes means for securing said wires to maintain the tension imposed thereon during periods when the wires are disconnected from a hose carcass.

(References on following page)

References Cited in the file of this patent

UNITED STATES PATENTS

| | | |
|---|---|---|
| 575,398 | Huestis | Jan. 19, 1897 |
| 710,688 | Heyl-Dia | Oct. 7, 1902 |
| 1,165,550 | Smith | Dec. 28, 1915 |
| 1,257,036 | Smith | Feb. 19, 1918 |
| 1,516,620 | Rankin | Nov. 25, 1924 |
| 1,753,793 | Lang | Apr. 8, 1930 |
| 1,894,756 | Clark | Jan. 17, 1933 |
| 1,972,290 | Conner | Sept. 4, 1934 |
| 1,990,514 | Angell | Feb. 12, 1935 |
| 2,131,069 | Pierce | Sept. 27, 1938 |
| 2,156,652 | Harris | May 2, 1939 |
| 2,213,585 | Irwine | Sept. 3, 1940 |
| 2,342,342 | Hotchkiss et al. | Feb. 22, 1944 |
| 2,539,853 | Meyers et al. | Jan. 30, 1951 |
| 2,540,201 | Haren | Feb. 6, 1951 |
| 2,560,369 | Roberts | July 10, 1951 |
| 2,584,501 | Roberts | Feb. 5, 1952 |
| 2,625,979 | Harris et al. | Jan. 20, 1953 |
| 2,731,070 | Meissner | Jan. 17, 1956 |
| 2,740,459 | Kilborn et al. | Apr. 3, 1956 |